Patented Apr. 26, 1949

2,468,426

UNITED STATES PATENT OFFICE 2,468,426

CARBOALKOXYALKYLCARBOALKOXY SULFIDES

Lee C. Cheney and John Robert Piening, Detroit, Mich., assignors to Parke, Davis & Company, Detroit, Mich., a corporation of Michigan No Drawing. Application August 13, 1945, Serial No. 610,687

8 Claims. (Cl. 260—470)

This application is a continuation-in-part of our co-pending application Serial No. 550,484 filed August 21, 1944, and the invention relates to carboalkoxyalkylcarboalkoxy sulfides and to methods for obtaining the same, said sulfides having the formula,

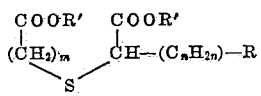

wherein R' is a member of the class hydrogen and lower saturated alkyl groups, $m=1$ or 2, $n=1$ to 8 inclusive in a straight or branched aliphatic carbon chain, and R is a member of the class —COOH, —COO (lower alkyl), aryloxy, aralkoxy and alkoxy.

These sulfides are new compounds which are useful in the preparation of compounds possessing valuable therapeutic properties. They are particularly useful as intermediates in the synthesis of compounds possessing biotin and possibly antibiotin activity.

According to the invention, mixed sulfides of the above type are conveniently prepared in excellent yields by condensing an alkyl halide carrying a carboxylic acid or carboxylic acid ester substituent group in addition to the group R, with an alkyl mercaptan which is also substituted by a carboxylic acid group or a carboxylic acid ester group, in the presence of an acid-binding agent. This process is illustrated diagrammatically below.

Sodium hydroxide or equivalent suitable hydrohalic acid binding agent can be used for the condensation in amount necessary to neutralize any free carboxylic acid groups and also hydrohalic acid of the condensation. Acidification of the reaction mixture with mineral acid throws the sulfide product out of solution and makes possible the easy isolation of the pure dibasic organic acid. Inasmuch as the corresponding ester is usually the desired product, it is often advantageous to directly esterify the crude acid and then purify the compound in the form of its ester by fractional distillation.

Because of the tendency of mercaptans to undergo atmospheric oxidation and to be thus partially converted into the corresponding disulfides we have found it advantageous to prepare the alkali salt of the mercaptan by reacting the corresponding halide with thiourea, and then to hydrolyze the resulting S-alkyl-thiuronium salt by treatment with an excess of the alkali; thus,

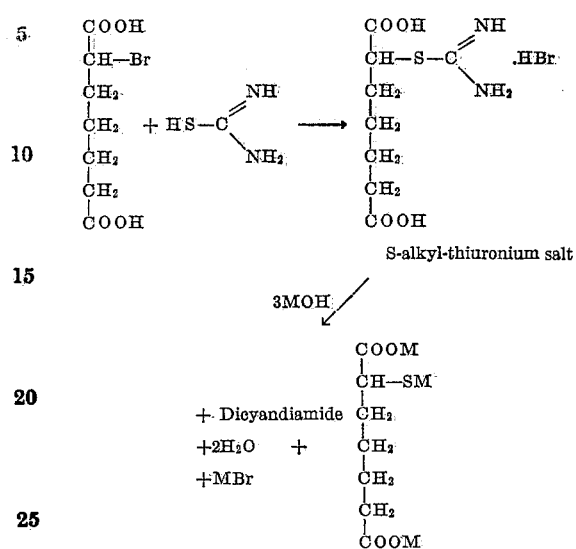

We have ascertained that the presence of dicyandiamide and all other products of the hydrolysis are not deleterious during the formation of the acid sulfide or during the subsequent esterification and distillation of the ester sulfide. Consequently, the alkyl halide is added directly to the mixture resulting from the hydrolysis, along with the calculated amount of alkali required to complete the formation of the acid sulfide. With the application of heat, the condensation proceeds rapidly and practically quantitatively.

Esterification of the acid sulfide is readily accomplished by removing solvent at reduced pressure and then refluxing the residue for several hours with a large excess of alcohol in the presence of mineral acid. The pure ester sulfide is isolated as described in the examples.

The mercaptans used as starting materials may also be prepared by the reacting the alkyl halide with potassium ethyl xanthate and then hydrolyzing the resulting S-alkyl ethyl xanthate by treatment with ammonia. This is illustrated by the following specific example.

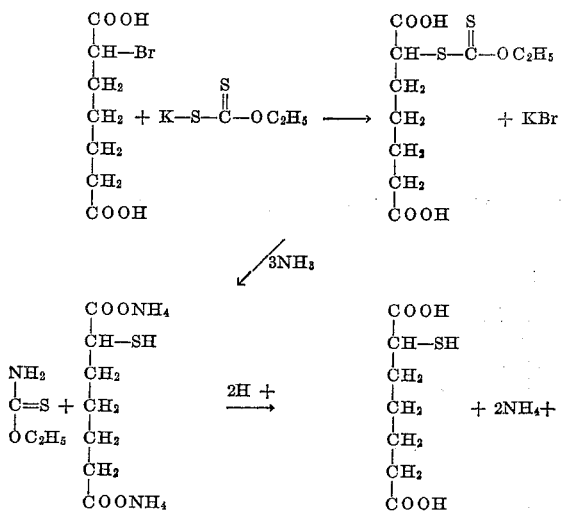

In the above example it will be noted that the hydrolysis produces a mixture of the ammonium salt of the thio acid and xanthogenamide,

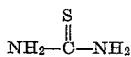

These two reaction products may be easily separated by extraction with ether or a similar solvent. The crude free mercapto acid which is obtained by acidification of the ammonium salt is suitable for use in the preparation of the new sulfides of the present invention without further purification.

The products of the invention may be represented by the formula,

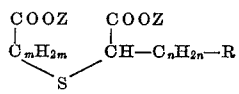

where $m$ is one of the integers 1 and 2, $n$ is an integer from 1 to 8 inclusive, Z is a member of the class consisting of hydrogen, an alkali metal and lower alkyl radicals and where R is a member of the class consisting of alkoxy, phenalkoxy and phenyloxy.

The process of the invention may be represented as follows:

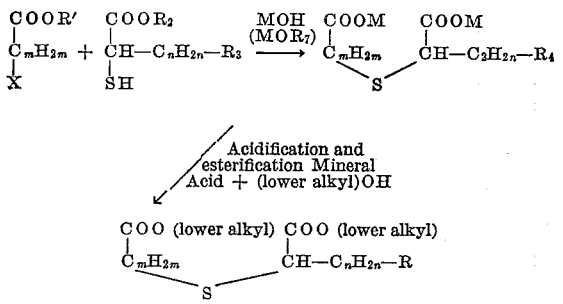

In the above formulas, X is a halogen of the class chlorine, bromine and iodine, $m$ is 1 or 2, $n$ is an integer from 1 to 8 inclusive, $R_1$ and $R_2$ represent lower alkyl radicals or hydrogen or alkali metal. $R_3$ is —COOH, —COO(lower alkyl), alkoxy, aralkoxy or aryloxy.

When $R_1$ or $R_2$ is an alkyl group or when $R_3$ is —COO (lower alkyl), the condensing agent should be $MOR_7$ where M is an alkali metal and $R_7$ is a lower alkyl radical. When using $MOR_7$, care should be taken that reaction conditions and temperatures are not so great as to cause undesired condensation or side reactions.

Depending upon the value of $R_3$ and the condensing agent used, $R_4$ will be one of —COOM, alkoxy, aralkoxy and aryloxy. R has one of the values —COO(lower alkyl), alkoxy, aralkoxy and aryloxy.

From the above diagram it will be seen that when the carboxylic acid groups of the compounds to be condensed are in the free acid form or in the form of the corresponding alkali metal salts, the condensation agent of choice is alkali metal hydroxide. The amount needed is preferably at least that which will neutralize any free acid groups and also the hydrohalic acid produced during the condensation that generates the sulfide linkage.

The invention is illustrated by the following examples.

*Example 1.—β-Carboxyethyl-α,ω-dicarboxyamyl sulfide*

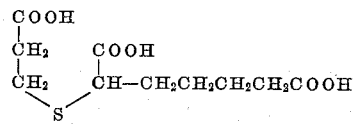

A mixture consisting of 194.6 g. (1 mole) of α-chloropimelic acid, 75.1 g. (1 mole) of thiourea, 5 g. of sodium iodide and 800 ml. of alcohol is refluxed on the steam bath for 24 hours. Following the removal of most of the alcohol under reduced pressure, the mixture is treated with a solution of 180 g. (4.5 moles) of sodium hydroxide in 700 ml. of water and refluxed for 1.5 hours. Then 22 g. of sodium hydroxide dissolved in 100 ml. of water is added. To the cooled stirred solution an alcoholic solution of 152.5 g. (1 mole) of β-bromopropionic acid is added slowly with stirring. The mixture is stirred and refluxed for 1 hour and then the alcohol distilled off. The mixture is cooled in an ice bath, made acid to Congo red with concentrated hydrochloric acid and evaporated to dryness under reduced pressure. The residue consists of inorganic salts and the desired sulfide. This residue may be used directly in the esterification process as shown in Example 2. However if the pure sulfide is desired it may be obtained by extracting the residue with n-propanol, filtering the extract and evaporating the n-propanol under reduced pressure.

*Example 2.—β-Carboethoxyethyl-α,ω-dicarbethoxyamyl sulfide*

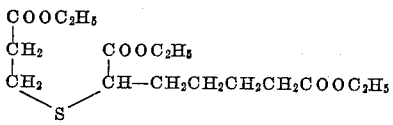

The residue of Example 1 consisting of inorganic salts and β-carboethoxyethyl-α,ω-dicarboxyamyl sulfide is refluxed for six hours with 1300 ml. of absolute ethanol and 26 ml. of concentrated sulfuric acid. After most of the alcohol has been removed by rapid distillation, the residue is poured onto ice and extracted three times with ether. The combined ether extracts are washed with 10% sodium bicarbonate solution and dried over sodium sulfate. The drying agent is removed by filtration, the ether evaporated and the residue distilled to obtain the β-carboethoxyethyl-α,ω-dicarbethoxyamyl sulfide as a colorless oil; B. P. 210–13° C./3 mm.

Example 3.—α-Carboxymethyl-α,ω-dicarboxyamyl sulfide

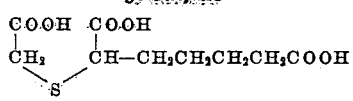

160 g. (1 mole) of potassium ethyl xanthate dissolved in 175 ml. of water is treated with 65 g. (0.33 mole) of α-chloropimelic acid and the mixture shaken in an open flask for about an hour until solution is complete. The flask is stoppered and allowed to stand for 24 hours. The mixture is acidified to Congo red with 5 N hydrochloric acid which causes the S-substituted ethyl xanthate to be liberated. The xanthate is extracted from the mixture with chloroform or n-butanol, the extract dried and the alcohol or chloroform removed by distillation in vacuo. The residue is dissolved in absolute alcohol (about 300 ml.), cooled and then treated with 250 ml. of 27% ammonium hydroxide. If an oil separates at this point enough alcohol is added to effect solution. The mixture is allowed to stand at room temperature for three days and then evaporated to dryness on a water bath. The residue is made alkaline with ammonium hydroxide, extracted with several portions of ether and the ether extract discarded. The residue is made acid with dilute hydrochloric acid and the mixture extracted exhaustively with chloroform. The chloroform extracts are dried and the chloroform distilled. The residue which consists of substantially pure α-thiopimelic acid is dissolved in 150 ml. of 10 N sodium hydroxide solution and used in the next step of the process.

An alcoholic solution of 31.5 g. (0.33 mole) of chloroacetic acid is added slowly with stirring to the above solution of α-thiopimelic acid and the resulting mixture refluxed for one hour. The alcohol is distilled off, the mixture cooled and made acid to Congo red with concentrated hydrochloric acid. The mixture is evaporated to dryness in vacuo and the residue extracted with several portions of n-propanol. The n-propanol extracts are dried over anhydrous sodium sulfate and the n-propanol distilled. The oily residue consists of the desired α-carboxymethyl-α,ω-dicarboxyamyl sulfide.

Example 4.—α-Carbethoxymethyl-α,ω-dicarbethoxyamyl sulfide

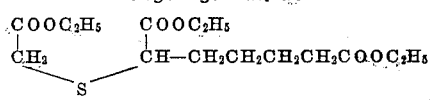

A mixture consisting of 25 g. α-carboxymethyl-α,ω-dicarboxyamyl sulfide, 500 ml. of absolute ethanol and 5 ml. of concentrated sulfuric acid is refluxed for six hours. Most of the alcohol is distilled off, the residue poured onto ice and extracted three times with ether. The ether extracts are washed with 10% sodium bicarbonate solution and dried over sodium sulfate. The solvent is distilled and the residue distilled under reduced pressure to obtain the α-carbethoxymethyl-α,ω-dicarbethoxyamyl sulfide as a colorless oil.

Example 5.—β-Carboxyethyl-α,ω-dicarboxy-δ-ethylamyl sulfide

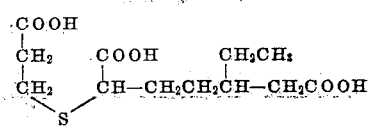

A mixture consisting of 222.6 g. (1 mole) of α-chloro-δ-ethylpimelic acid, 76.1 g. of thiourea, 6 g. of sodium iodide and 800 ml. of ethanol is refluxed on the steam bath for 24 hours. Most of the alcohol is removed by distillation under reduced pressure and the mixture treated with a solution of 180 g. (4.5 moles) of sodium hydroxide in 700 ml. of water. The mixture is refluxed for 1.5 hours, cooled and 22 g. of sodium hydroxide in 100 ml. of water added. An alcoholic solution of 108.5 g. (1 mole) of β-chloropropionic acid is added slowly to the mixture with stirring. The mixture is refluxed for 1 hour, the alcohol distilled off and the residue cooled. The solution is made acid to Congo red with concentrated hydrochloric acid and evaporated to dryness under reduced pressure. The residue is extracted with absolute alcohol, the extracts filtered and evaporated to dryness in vacuo. The residue consists of the desired β-carboxyethyl-α,ω-dicarboxy-δ-ethylamyl sulfide.

Example 6.—β-Carbopropoxyethyl-α,ω-dicarbopropoxy-δ-ethylamyl sulfide

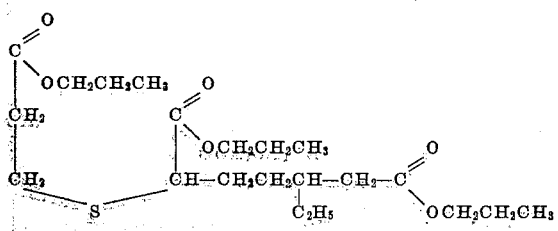

A mixture consisting of 50 g. of β-carboxyethyl-α,ω-dicarboxy-δ-ethylamyl sulfide, 5 ml. of concentrated sulfuric acid and 350 ml. of n-propanol is refluxed for 6 hours. Most of the n-propanol is removed by distillation in vacuo and the residue poured onto ice. The mixture is extracted with three portions of ether, the combined ether extracts washed with 10% sodium bicarbonate solution and dried over anhydrous sodium sulfate. The ether is evaporated and the residue distilled under reduced pressure to yield the desired β-carbopropoxyethyl-α,ω-dicarbopropoxy-δ-ethylamyl sulfide as a colorless oil.

Example 7.—β-Carboxyethyl-α,γ-dicarboxypropyl sulfide

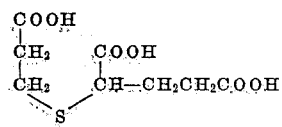

160 g. (1 mole) of potassium ethyl xanthate dissolved in 175 ml. of water is treated with 70 g. (0.33 mole) of α-bromoglutaric acid and the mixture shaken in an open flask for about one hour. The flask is stoppered and the mixture allowed to stand for 24 hours. The mixture is acidified to Congo red with 6 N hydrochloric acid and the mixture extracted with several portions of n-butanol. The combined n-butanol extracts are dried over anhydrous sodium sulfate, the drying agent removed by filtration and the n-butanol distilled under reduced pressure. The residue is dissolved in 300 ml. of absolute alcohol, cooled, the solution treated with 250 ml. of 27% ammonium hydroxide and the solution allowed to stand at room temperature for three days. The solution is evaporated to dryness on a water bath, the residue made alkaline with ammonium hydroxide and extracted with ether. The ether extract is discarded and the residue made acid with dilute hydrochloric acid. The mixture is evaporated to dryness in vacuo and the residue extracted with several portions of absolute ethanol. The combined extracts are filtered and evaporated in vacuo whereby α-thioglutaric acid is obtained.

The α-mercaptoglutaric acid obtained above is dissolved in 150 ml. of 10 N sodium hydroxide solution and the solution treated with an alcoholic solution of 41 g. (0.33 mole) of ethyl chloroacetate. The resulting mixture is refluxed for two hours and then the alcohol removed by distillation. The aqueous solution is cooled, made acid to Congo red with concentrated hydrochloric acid and evaporated to dryness in vacuo. The residue is extracted with several portions of isopropanol, the extracts filtered and the iso-propanol distilled off in vacuo. The residue consists of substantially pure β-carboxyethyl-α,γ-dicarboxypropyl sulfide.

*Example 8.—β - Carbomethoxyethyl-α,γ-dicarbomethoxypropyl sulfide*

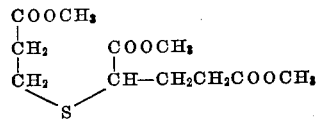

A mixture consisting of 50 g. of β-carboxyethyl-α,γ-dicarboxypropyl sulfide, 400 ml. of dry methanol and 5 ml. of concentrated sulfuric acid is refluxed for eight hours. Most of the methanol is removed by distillation and the residue poured onto ice. The mixture is extracted with three portions of ether, the ether extracts washed with 10% sodium bicarbonate solution and dried over anhydrous magnesium sulfate. The drying agent is removed by filtration, the ether evaporated and the residue distilled under reduced pressure to obtain the pure β-carbomethoxyethyl-α,γ-dicarbomethoxypropyl sulfide as a colorless oil.

*Example 9.—β-Carboxyethyl-α-carboxy-δ-phenoxybutyl sulfide*

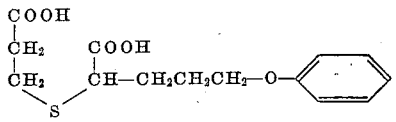

A mixture consisting of 121.3 g. (0.5 mole) of methyl α-chloro-δ-phenoxyvalerate, 38 g. (0.5 mole) of thiourea, 4 g. of sodium iodide and 400 ml. of absolute ethanol is refluxed on a steam bath for twenty hours. About two-thirds of the alcohol is removed by distillation, the residue treated with 80 g. (2 moles) of sodium hydroxide in 400 ml. of water. The mixture is stirred and refluxed for two hours, cooled and allowed to stand overnight. A solution of 20 g. (0.5 mole) of sodium hydroxide in 200 ml. of water is added and then the mixture warmed to about 50° C. An alcoholic solution of 77 g. (0.5 mole) of β-bromopropionic acid is added dropwise over a period of 45 minutes. The mixture is heated for two hours and then the alcohol distilled off. The solution is cooled, extracted with ether and the ether extracts discarded. The aqueous solution is cooled in an ice bath, made acid to Congo red with concentrated hydrochloric acid and evaporated to dryness in vacuo on the steam bath. The dry residue is extracted with several portions of absolute ethanol, the extracts filtered and dried over anhydrous sodium sulfate. The drying agent is removed by filtration and the ethanol distilled to obtain the desired β-carboxyethyl-α-carboxy-δ-phenoxybutyl sulfide as a white solid. The product is recrystallized from benzene to obtain the pure white crystals melting at 89.5–90.5° C.

*Example 10.—β-Carbethoxyethyl-α-carbethoxy-δ-phenoxy-butyl sulfide*

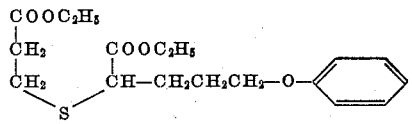

A mixture consisting of 50 g. of β-carboxyethyl-α-carboxy-δ-phenoxybutyl sulfide, 3 ml. of concentrated sulfuric acid and 350 ml. of absolute ethanol is refluxed for six hours on a steam bath. Most of the alcohol is distilled off under reduced pressure and the residue poured onto ice. The mixture is extracted with three portions of ether, the extracts dried over anhydrous sodium sulfate and filtered to remove the drying agent. The ether is evaporated and the residue distilled under reduced pressure to the pure ester as a pale yellow oil; B. P. 200–205 C./3 mm.; $n_D^{20}$ 1.5120.

*Example 11.—β-Carbomethoxyethyl-α-carbomethoxy-δ-phenoxybutyl sulfide*

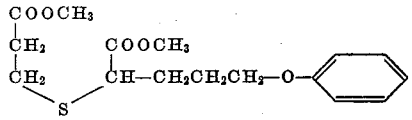

A mixture consisting of 75 g. of β-carboxyethyl-α-carboxy-δ-phenoxybutyl sulfide, 400 ml. of dry methanol and 6 ml. of concentrated sulfuric acid is refluxed on a steam bath for eight hours. Most of the alcohol is removed by distillation and the residue poured onto ice. The mixture is extracted three times with ether, the ether extract washed with 10% sodium bicarbonate solution, dried over sodium sulfate, filtered and the ether evaporated. Distillation of the residue under reduced pressure yields the desired β-carbomethoxyethyl - α - carbomethoxy - δ - phenoxybutyl sulfide; B. P. 200–10 C./3 mm.; $n_D^{20}$ 1.5248.

*Example 12.—β-Carboxyethyl-α-carboxy-δ-benzyloxybutyl sulfide*

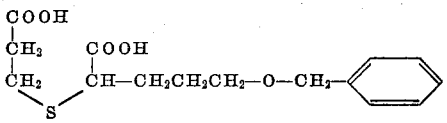

121.3 g. (0.5 mole) of α-chloro-δ-benzyloxyvaleric acid is added to a solution of 230 g. (1.5 moles) of potassium ethyl xanthate in 275 ml. of water and the mixture shaken in an open flask for about an hour. The flask is stoppered and allowed to stand for twenty-four hours. The mixture is acidified to Congo red with 5 N hydrochloric acid, extracted with n-butanol, the extracts dried over anhydrous magnesium sulfate. The drying agent is removed by filtration and the n-butanol distilled off in vacuo. The residue is dissolved in 450 ml. of absolute alcohol, cooled and treated with 350 ml. of 27% ammonium hydroxide. The mixture is allowed to stand for three days and then evaporated to dryness on a water bath. The residue is made alkaline with concentrated ammonium hydroxide, extracted with several portions of ether and the ether extracts discarded. The residue is acidified to Congo red with concentrated hydrochloric acid and extracted exhaustively with chloroform, The chloroform extracts are dried with anhydrous magnesium sulfate, filtered and the chloroform distilled off and the residue which consists of α-thio-δ-benzyloxyvaleric acid dissolved in 150 ml. of 10 N sodium hydroxide solution.

An alcoholic solution of 77 g. (0.5 mole) of β-bromopropionic acid is added slowly with stirring to the above alkaline solution of α-thio-δ-benzyloxyvaleric acid and the resulting mixture refluxed for one hour. The alcohol is distilled off, the mixture cooled and made alkaline to Congo red with concentrated hydrochloric acid. The reaction mixture is evaporated to dryness under reduced pressure and the residue extracted with several portions of ether. The ether extracts are dried, filtered and the ether evaporated to obtain the desired β-carboxyethyl-α-carboxy-δ-benzyloxybutyl sulfide as an oil.

*Example 13.—β-Carbethoxyethyl-α-carbethoxy-δ-benzyloxybutyl sulfide*

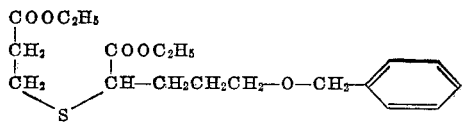

A mixture consisting of 75 g. of β-carboxyethyl-α-carboxy-δ-benzyloxybutyl sulfide, 500 ml. of absolute alcohol and 8 ml. of concentrated sulfuric acid is refluxed on a steam bath for six hours. Most of the alcohol is distilled off and the residue poured onto ice. The mixture is extracted with several portions of ether and the combined ether extracts washed with 10% sodium bicarbonate solution and dried over anhydrous sodium sulfate. The drying agent is removed by filtration and the ether by distillation. Distillation of the residue under reduced pressure yields the desired β-carbethoxyethyl-α-carbethoxy-δ-benzyloxybutyl sulfide; B. P. 200–16° C./2 mm.; $n_D^{20}$ 1.5118.

*Example 14.—β-Carboxyethyl-α-carboxy-ε-ethoxyamyl sulfide*

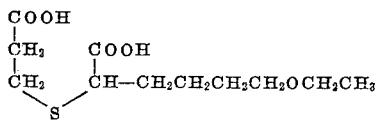

A mixture consisting of 194.5 g. (1 mole) of α-chloro-ε-ethoxycaproic acid, 76 g. (1 mole) of thiourea and 5 g. of sodium iodide in 800 ml. of absolute ethanol is refluxed on a steam bath for fifteen hours. The alcohol is removed by distillation under reduced pressure, the residue treated with 180 g. (4.5 moles) of sodium hydroxide in 700 ml. of water and the mixture refluxed for one and one-half hours. 22 g. of sodium hydroxide dissolved in 100 ml. of water is added and the solution added slowly to an alcoholic solution of 181 g. (1 mole) of ethyl β-bromopropionate with stirring. The mixture is refluxed for one hour and the alcohol distilled off. The residue is cooled in an ice bath, made acid to Congo red with concentrated hydrochloric acid and evaporated to dryness in vacuo. The residue is extracted with several portions of absolute ethanol, the combined extracts dried over anhydrous magnesium sulfate, filtered and the alcohol distilled off. The residual oil consists of substantially pure β-carboxyethyl-α-carboxy-ε-ethoxyamyl sulfide.

*Example 15.—β-Carbopropoxyethyl-α-carbopropoxy-ε-ethoxyamyl sulfide*

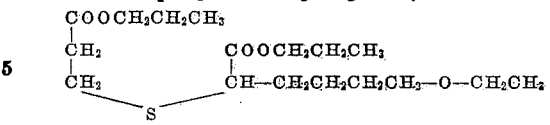

A mixture consisting of 50 g. of β-carboxyethyl-α-carboxy-ε-ethoxyamyl sulfide, 5 ml. of concentrated sulfuric acid and 300 ml. of n-propanol is refluxed for six hours and then most of the alcohol distilled off under reduced pressure. The residue is poured onto ice and the mixture extracted with several portions of ether. The combined ether extracts are washed with 10% sodium bicarbonate solution, dried over anhydrous sodium sulfate and the ether distilled. The residue is distilled under reduced pressure to obtain the pure β-carbopropoxyethyl-α-carbopropoxy-ε-ethoxyamyl sulfide.

*Example 16.—α-Carboxymethyl-α-carboxy-ζ-phenoxyhexyl sulfide*

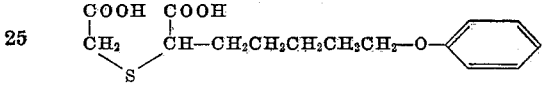

A mixture consisting of 129.3 g. (0.5 mole) of α-chloro-ζ-phenoxyheptoic acid, 38 g. (0.5 mole) of thiourea, 5 g. of sodium iodide and 400 ml. of absolute ethanol is refluxed for twelve hours and then most of the alcohol distilled off in vacuo. The residue is treated with 80 g. (2 moles) of sodium hydroxide in 300 ml. of water and the mixture refluxed for 1.5 hours. The mixture is cooled, 10 g. of sodium hydroxide in 50 ml. of water added and the solution added slowly with stirring to an alcoholic solution of 47.3 g. (0.5 mole) of chloroacetic acid. The mixture is stirred and refluxed for two hours, the alcohol distilled off and the cool mixture made acid to Congo red with concentrated hydrochloric acid. The reaction mixture is evaporated to dryness in vacuo and the residue extracted with several portions of hot benzene. The hot extracts are filtered and the benzene distilled off in vacuo. The residue consists of practically pure α-carboxymethyl-α-carboxy-ζ-phenoxyhexyl sulfide.

*Example 17.—α-Carbethoxymethyl-α-carbethoxy-ζ-phenoxyhexyl sulfide*

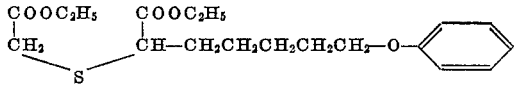

A mixture consisting of 50 g. of α-carboxymethyl-α-carboxy-ζ-phenoxyhexyl sulfide, 300 ml. of absolute ethanol and 5 ml. of concentrated sulfuric acid is refluxed on a steam bath for six hours. Most of the alcohol is removed by distillation in vacuo and the residue poured onto ice. The mixture is extracted three times with ether, the ether extracts dried over anhydrous magnesium sulfate and filtered. The ether is evaporated from the filtrate and the residue distilled under reduced pressure to obtain the pure α-carbethoxymethyl - α - carbethoxy-ζ-phenoxyhexyl sulfide.

*Example 18.—β-Carbethoxyethyl-α,ε-dicarbethoxyamyl sulfide*

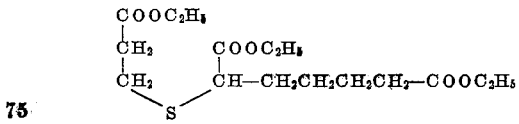

A mixture consisting of 194.6 g. (1.0 mole) of α-chloropimelic acid, 76.1 g. (1.0 mole) of thiourea, 5 g. of sodium iodide and 800 ml. of alcohol is refluxed on the steam bath for 24 hours. Following the removal of most of the alcohol under reduced pressure, the mixture is treated with a solution of 180 g. (4.5 moles) of sodium hydroxide in 700 ml. of water and refluxed for 1.5 hours. Then 22 g. of sodium hydroxide dissolved in 100 ml. of water is added. To the cooled stirred solution is introduced slowly an alcoholic solution of 108.5 g. (1.0 mole) of β-chloropropionic acid. After refluxing the stirred solution for 1 hour the alcohol is distilled off. The residue is cooled in an ice bath, made acid to Congo red with concentrated hydrochloric acid and concentrated to dryness under reduced pressure. The residue is refluxed for six hours with 1300 ml. of absolute alcohol and 26 ml. of concentrated sulfuric acid. After most of the alcohol has been removed by rapid distillation, the residue is poured on ice and extracted three times with ether. Combined ether extracts are washed with 10% sodium bicarbonate solution and dried over sodium sulfate. Following removal of solvent, the β-carbethoxyethyl-α,ε-dicarbethoxyamyl sulfide distills as a colorless oil, B. P. 210–213° C./3 mm.

Attention is called to our copending applications Serial No. 550,483 filed August 21, 1944, and Serial No. 610,686 filed August 13, 1945, both relating to the preparation of some of the starting materials for the invention herein claimed.

What we claim as our invention is:

1. Process for the preparation of carboxylated alkyl sulfides which comprises condensing a mercapto carboxylic acid compound of formula,

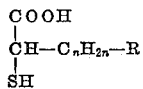

with a halo carboxylic acid of formula,

in the presence of an alkali metal hydroxide with the production of a sulfide of formula,

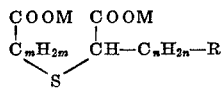

and converting said sulfide by means of mineral acid and a lower aliphatic alcohol (lower alkyl)OH, into its free acid and thereafter into the corresponding ester compound of formula,

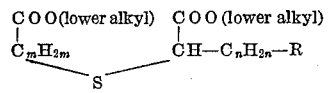

where $m$ is one of the integers 1 and 2, $n$ is an integer from 1 to 8 inclusive, X is a halogen of the class chlorine, bromine and iodine, M represents an alkali metal, and R is a member of the class consisting of alkoxy, phenalkoxy and phenyloxy.

2. Process for the preparation of carboxylated alkyl sulfides which comprises condensing a mercapto carboxylic acid of formula,

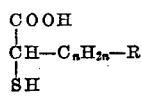

with a β-halo carboxylic acid of formula,

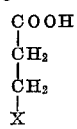

in the presence of an alkali metal hydroxide with production of a sulfide of formula,

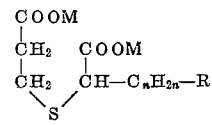

and converting said sulfide by means of mineral acid and lower aliphatic alcohol (lower alkyl)OH into its free acid and thereafter into the corresponding ester compound of formula,

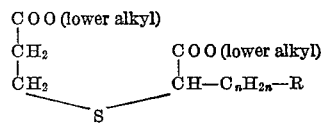

where $n$ is an integer from 1 to 8 inclusive, X is a halogen of the class chlorine, bromine and iodine, M represents an alkali metal, and R is a member of the class consisting of alkoxy, phenalkoxy and phenyloxy.

3. A compound of the formula,

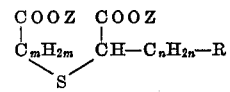

where $m$ is one of the integers 1 and 2, $n$ is an integer from 1 to 8 inclusive, Z is a member of the class consisting of hydrogen, an alkali metal and a lower alkyl radical and where R is a member of the class consisting of alkoxy, phenalkoxy and phenyloxy.

4. A compound of the formula,

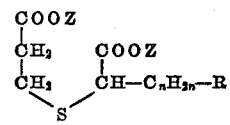

where $n$ is an integer from 1 to 8 inclusive, Z is a member of the class consisting of hydrogen, an alkali metal and a lower alkyl radical and where R is a member of the class consisting of alkoxy, phenalkoxy and phenyloxy.

5. A compound of the formula,

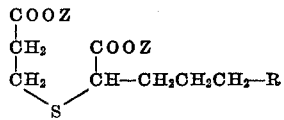

where Z is a member of the class consisting of hydrogen, an alkali metal and a lower alkyl radical and R is a member of the class alkoxy, phenalkoxy and phenyloxy.

6. A compound of the formula,

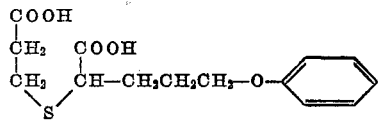

7. A compound of the formula,

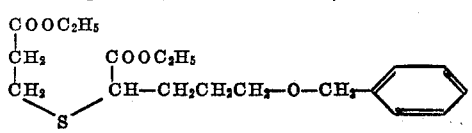

8. A compound of the formula,
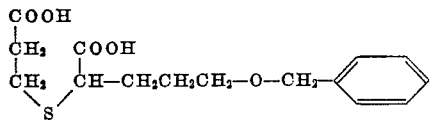
LEE C. CHENEY.
JOHN ROBERT PIENING.
REFERENCES CITED
The following references are of record in the file of this patent:
UNITED STATES PATENTS
| Number | Name | Date |
|---|---|---|
| 1,987,526 | Elbel | Jan. 8, 1935 |
| 2,354,231 | Walter | July 25, 1944 |
| 2,354,234 | Walter | July 25, 1944 |
| 2,416,100 | Karrer | Feb. 18, 1947 |
| 2,424,007 | Moore | July 15, 1947 |
OTHER REFERENCES
Karrer, "Helv. Chim. Acta," vol. 27 (1944), pp. 124–151 and 237–246.